United States Patent
Van Zijverden et al.

(10) Patent No.: US 6,286,646 B1
(45) Date of Patent: Sep. 11, 2001

(54) CURRENT COLLECTOR TROLLEY FOR A RAIL CURRENT SYSTEM

(75) Inventors: Corstiaan Jacob Van Zijverden, Lopik; Andre Pieter Willem Van Zaalen, Hooglanderveen, both of (NL)

(73) Assignee: Woodhead Industries, Inc., Deerfield, IL (US)

( * ) Notice: Subject to any disclaimer, the term of this patent is extended or adjusted under 35 U.S.C. 154(b) by 0 days.

(21) Appl. No.: 09/293,608

(22) Filed: Apr. 16, 1999

(30) Foreign Application Priority Data

Apr. 17, 1998 (NL) .................................................. 1008914

(51) Int. Cl.[7] ...................................................... B60L 5/00
(52) U.S. Cl. .............................. 191/45 R; 191/50; 191/57
(58) Field of Search ................................. 191/22 R, 23 R, 191/23 A, 45 R, 47, 48, 50, 57, 61, 63

(56) References Cited

U.S. PATENT DOCUMENTS

| | | | |
|---|---|---|---|
| 2,018,016 | * 10/1935 | Frank et al. ........................ | 191/23 R |
| 2,322,640 | * 6/1943 | Jackson et al. ..................... | 191/23 A |
| 2,586,414 | * 2/1952 | Barkis ................................ | 191/23 R |
| 3,399,281 | * 8/1968 | Corl .................................... | 191/23 R |
| 5,051,546 | * 9/1991 | Bormann et al. ................... | 191/57 |

* cited by examiner

Primary Examiner—Mark T. Le
(74) Attorney, Agent, or Firm—Emrich & Dithmar

(57) ABSTRACT

Conductor system for warehouse cranes or transporters servicing warehouse shelving. Each shelving unit contains a conductor with conductive elements which have been mounted in a vertical plane. At least one warehouse crane or transporter and an assembly carrier is coupled respectively to a warehouse crane or transporter and a collector trolley is connected by means of opposite and preferably shaped leaf springs to an assembly plate attached to the assembly carrier of the warehouse crane or transporter. Each collector trolley contains carbon brushes and wheels. One end of the leaf springs is attached to the assembly plate and the other end of the leaf springs is attached to a mounting plate carrying the carbon brushes. The leaf springs press the wheels of the collector trolley onto the conductor and the carbon brushes of each collector trolley onto the conductor's conductive elements. Collector trolley suitable for use in such conductor systems.

7 Claims, 4 Drawing Sheets

CURRENT COLLECTOR TROLLEY FOR A RAIL CURRENT SYSTEM

BACKGROUND OF THE INVENTION

The invention under consideration relates to a conductor system for warehouse cranes or transporters servicing warehouse shelving. The shelving is equipped with a conductor rail containing several conductive elements placed in a vertical plane. The system consists of at least one warehouse crane or transporter, with a collector trolley coupled respectively to a warehouse crane or transporter. Each collector trolley comprises of a body containing carbon brushes and wheels.

Such a system which uses an arm on the warehouse crane or transporter with a number of pick-up constructions is in practice known. Each pick-up construction consists of an arm which is hingeable under spring tension coupled to the arm with a tiltable carbon brush at the end. A spring at the end tensions the brush against one of the tilt-sides, to prevent the brush from tilting. A disadvantage of this system is that tilting can only be prevented in one transport direction. An additional disadvantage is that when the warehouse crane or transporter is removed from a conductor, the carbon brushes can tilt downwards, which is a problem when they return to their grip position on the conductor of the next section.

The purpose of the invention in consideration is to provide a conductor system for warehouse cranes or transporters which is not affected by the existing system's problems.

SUMMARY OF THE INVENTION

To this end, the underlying invention provides for a conductor system for warehouse cranes or transporters servicing warehouse shelving. Each shelving unit contains a conductor with conductive elements which have been mounted in a vertical plane. At least one warehouse crane or transporter and an assembly carrier is coupled respectively to a warehouse crane or transporter and a collector trolley is connected by means of opposite and preferably shaped leaf springs to an assembly plate attached to the assembly carrier of the warehouse crane or transporter. Each collector trolley contains carbon brushes and wheels. One end of the leaf springs is attached to the assembly plate and the other end of the leaf springs is attached to a mounting plate carrying the carbon brushes. The leaf springs press the wheels of the collector trolley onto the conductor and the carbon brushes of each collector trolley onto the conductor's conductive elements. When using a trolley with one mounting plate for the assembly of the carbon brushes, only a simple mechanical construction is required to press the carbon brushes against the conductive elements. By using opposite, preferably shaped leaf springs, a stable support for the carbon brushes with respect to a conductor is created, avoiding tilting.

The preferred conductor system configuration based on the invention is that each carbon brush is connected to the mounting plate by its own spring. Since the leaf springs press the trolley against a conductor, the pressure of the carbon brushes' springs can be less than usual increasing the stability of the mechanical construction.

The invention also covers a collector trolley suitable for use in a conductor system according to the invention.

The preferred collector trolley configuration according to the invention is that the assembly plate is mounted to the assembly carrier in a tiltable position. The mounting plate is preferably coupled to the assembly carrier by means of two top and two bottom nut-and-bolt constructions. The assembly plate and assembly carrier have slots for the fixings of the nut-and-bolt construction. These slots in the assembly plate and/or assembly carrier are elongated ovals. In this way, the assembly plate of the leaf springs can easily be moved, tilted and removed with respect to the assembly carrier for inspection or replacement.

BRIEF DESCRIPTION OF THE DRAWINGS

Some conductor system configurations for warehouse cranes or transporters and a collector trolley based on the invention, are described as examples, based on the figures whereby.

DETAILED DESCRIPTION OF THE PREFERRED EMBODIMENTS

Figure 1:
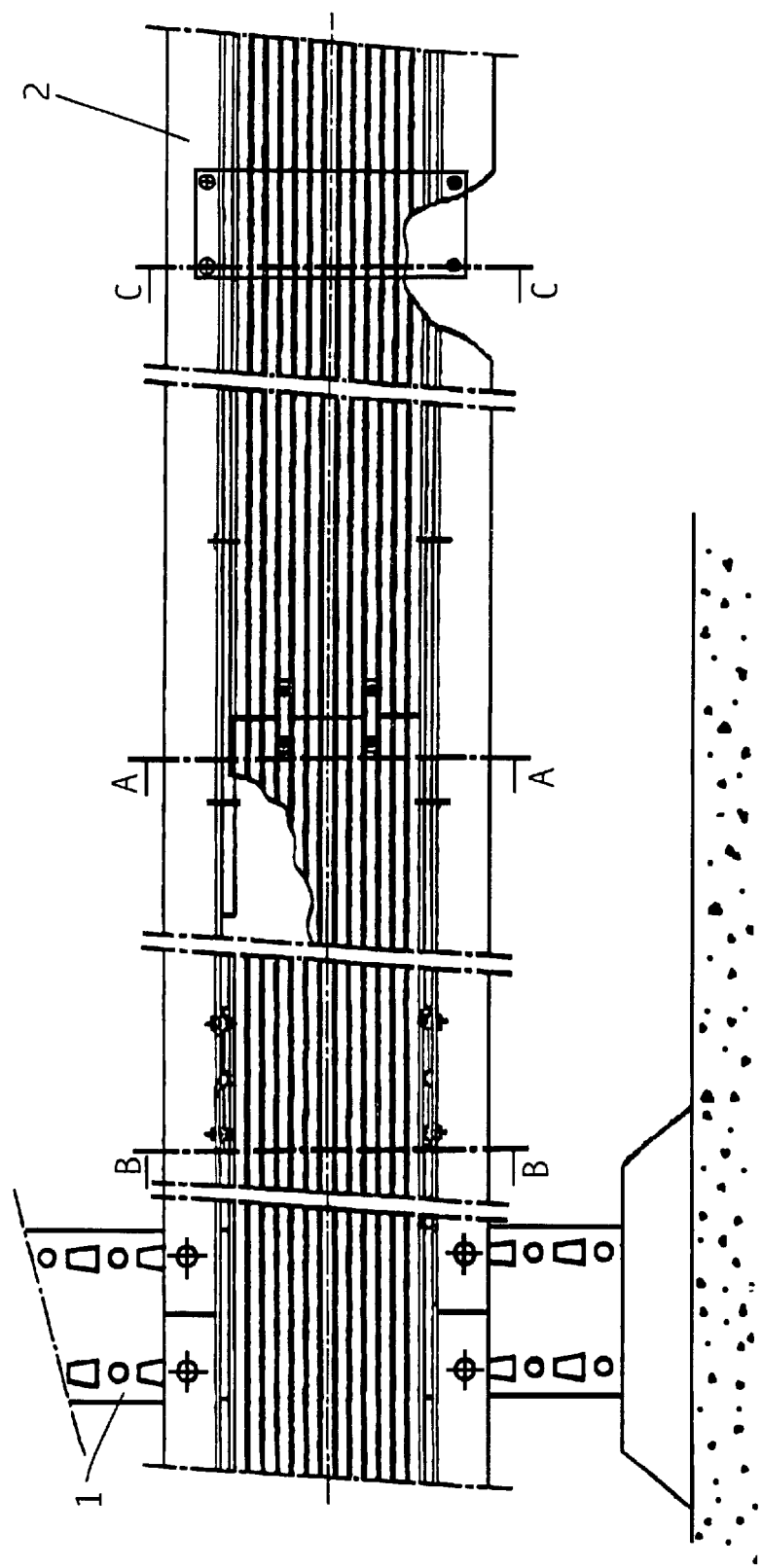
FIG. 1 shows a side-view of part of the warehouse shelving with a conductor.
Figure 2:
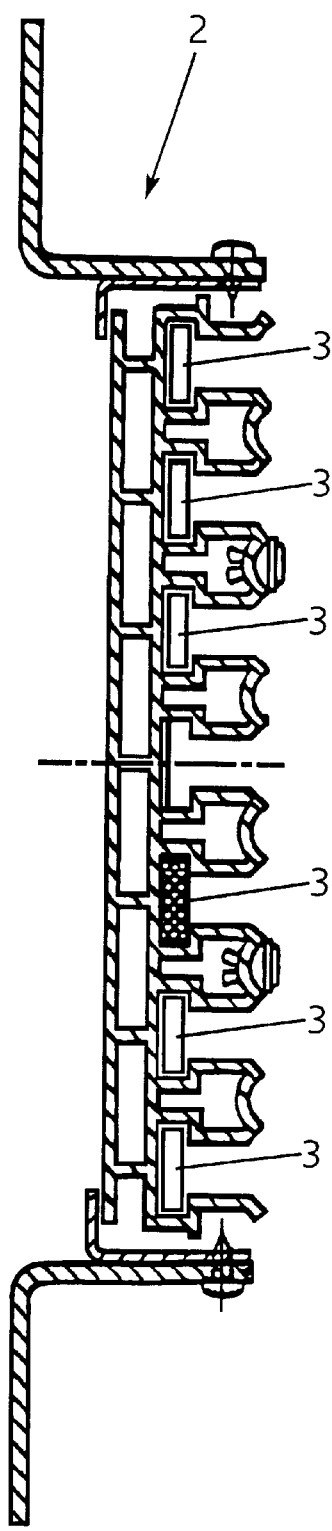
FIG. 2 shows a cross-section of a conductor.

A conductor system for warehouse cranes or transporters based on the invention comprises warehouse shelving, as shown in FIG. 1 (1) based on a support pillar for the warehouse shelving. The warehouse shelving is equipped with a conductor (2) with conductive elements (3) (refer to FIG. 2) which are placed in a vertical plane. The thickness of the conductive elements (3) and the current can be selected.

In addition, a conductor system for warehouse cranes or transporters based on the invention comprising at least one warehouse crane or transporter with a collector trolley (4) connected to it, as shown in FIGS. 3 to 6. The connection of a collector trolley (4) to a warehouse crane or transporter is described below.

An assembly carrier (5) is fixed respectively to a warehouse crane or transporter. A collector trolley (4) is by means of opposite, preferably (though not exclusively) shaped leaf springs (6, 6'; 7, 7') connected to the assembly. One end of the leaf springs is flexibly connected to an assembly plate (8), fixed to the assembly carrier (5) of a warehouse crane or transporter. The other end of the leaf springs is mounted on a single carrying plate (30), with carbon brushes (9) and wheels (10, 10'; 11, 11') mounted onto it. In this way, a common carrying construction for the carbon brushes is provided.

When the warehouse crane or transporter is in operation, the leaf springs (6, 6'; 7, 7') press the wheels (10, 10'; 11, 11') under tension against the ridges (12, 13) (also refer to FIG. 6) of a conductor (2). At the same time, the carbon brushes (9) of each collector trolley (4) are pressed against the conductive elements (3) of the conductor (2). The carbon brushes (9) are connected to the electric cables (14) which provide power to the parts of the warehouse crane or transporter in the usual manner.

The shaped leaf springs (O-shaped, for example) ensure that the carbon brushes are stably and reliably pressed against the conductive elements while at the same time prevent the carbon brushes from tilting when they are not pressed against the conductor. By selecting the dimensions and spring constant of the leaf springs, the required tension can be achieved.

Each carbon brush is preferably connected to the accompanying collector trolley by its own spring. In this way, the carbon brushes' springs can be less strong but still guarantee stable and, under all circumstances, reliable tension of the carbon brushes against the conductive elements. In addition, the carbon brushes can be pressed against the conductive elements of a conductor from another section without any additional intervention when moving the warehouse crane or transporter to another section.

In the new configuration, the tiltable assembly of the plate to the carrier simplifies inspection or replacement of the collector trolley (4). The tilting assembly is preferably realized using the special assembly plate (8) and mounting it on the assembly carrier (5), as described below.

Figure 4:
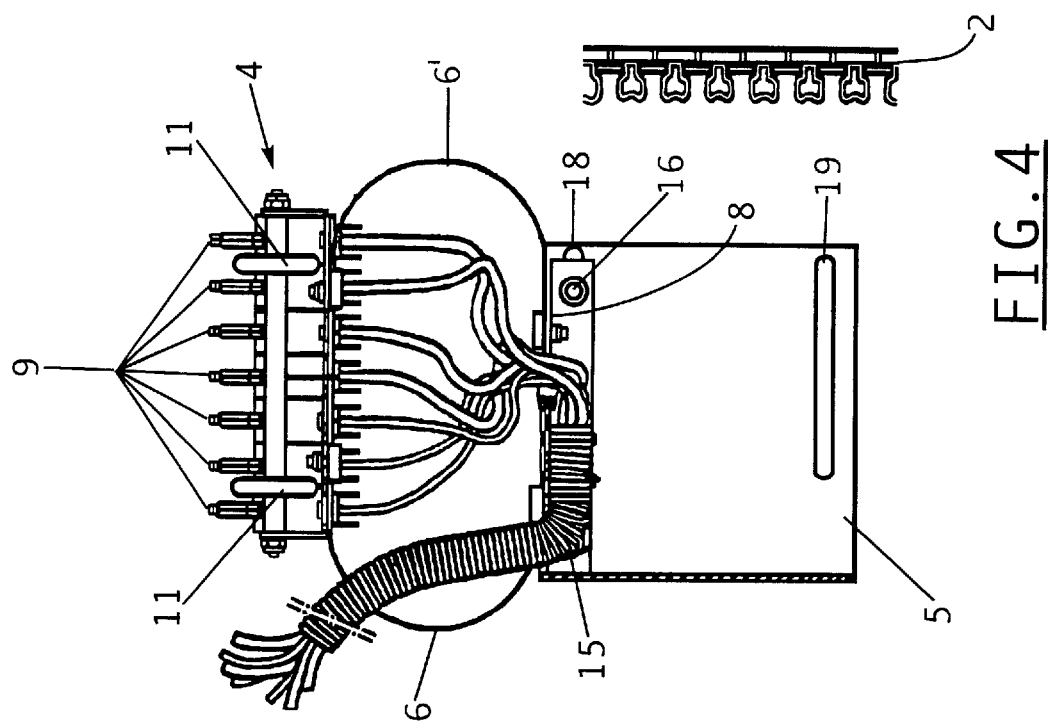
FIG. 4 shows a side-view of FIG. 3.
Figure 3:
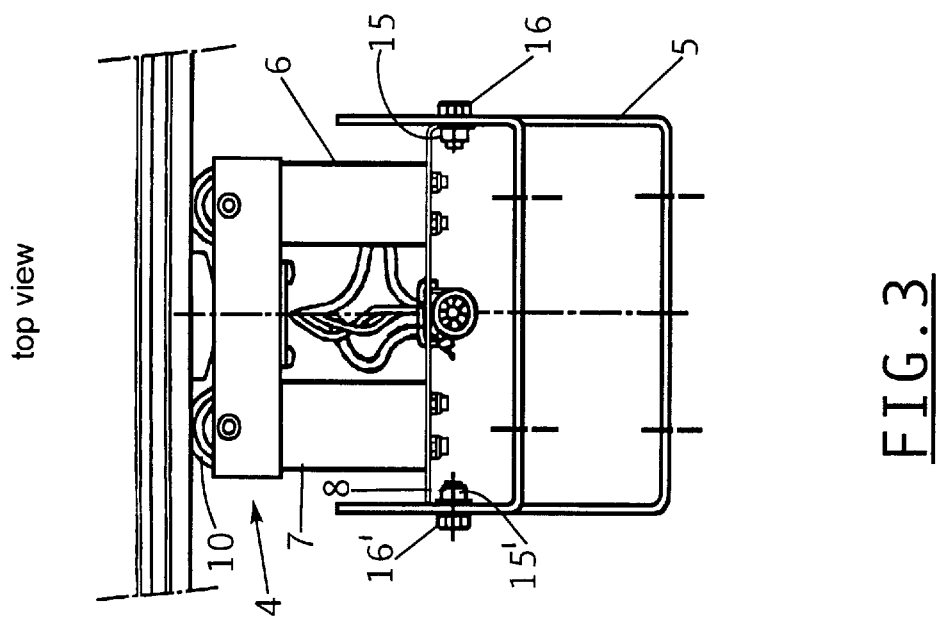
FIG. 3 shows a top view of a collector trolley based on the invention.
Figure 6:
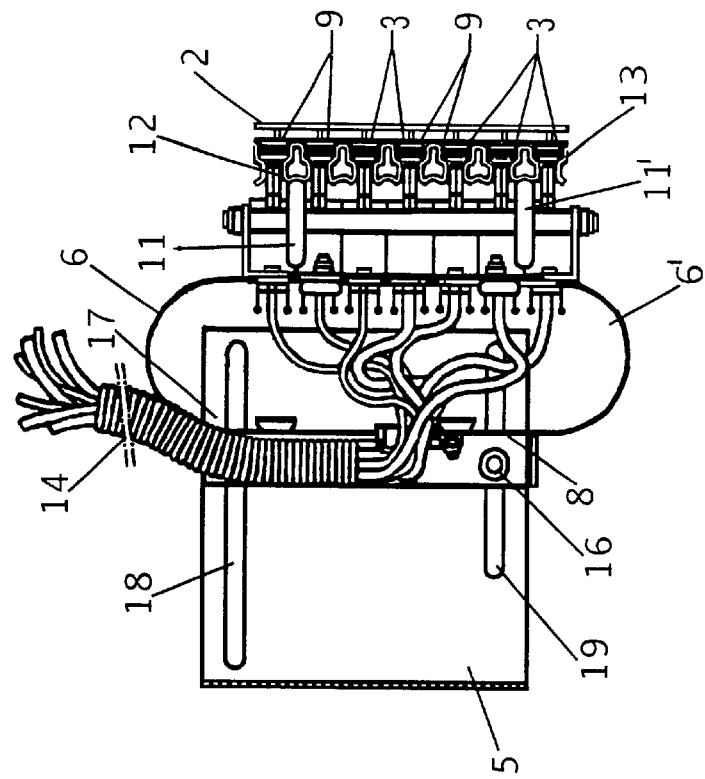
FIG. 6 shows a side-view of a collector trolley pressed against a conductor.
Figure 5:
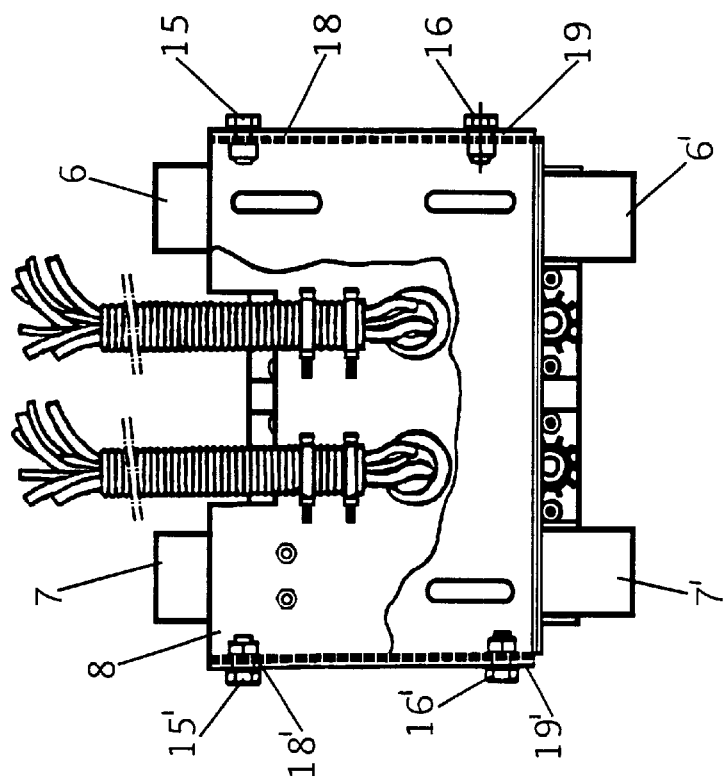
FIG. 5 shows a front view of FIG. 3.

The assembly plate (8) is mounted onto the assembly carrier (5) using the two top (15, 15') and the two bottom (16, 16') nut-and-bolt constructions. To this end, the assembly carrier has two pairs of mutually parallel slots (18, 18' and 19, 19') which enable accurate alignment in the direction C (refer to FIG. 6). As clearly shown in FIG. 4, the assembly plate (8) can be moved from a lying position in front of the conductor to the position as shown in FIG. 6 by first, slightly loosening bolts (15, 15') (but not removing them). Subsequently, fully removing the bottom bolts (16, 16') and then pushing the assembly plate (8) backwards in the C1 direction until the bolts (15, 15') reach the back of the slots (18, 18'). Then the assembly plate (8) is turned upwards in direction D and finally one or two bolts (16, 16') are inserted in the slots (18, 18') and slightly tightened. When this is done, the assembly plate is held in the position as shown in FIG. 4 and the trolley (4) is easily accessible.

What is claimed is:

1. For use in a material transport system including a plurality of shelves each having plural elongated power conductor elements and ridges arranged in alignment thereon, wherein objects are positioned on or removed from said shelves by a mobile machine, a current collector trolley for providing electric power to said mobile machine, said current collector trolley comprising:

a carrier assembly moveable with the mobile machine;

a conductor assembly having a plurality of spaced, aligned sliding contact brushes and wheels; and tension coupling means for connecting said carrier assembly and said conductor assembly and urging each sliding contact brush into intimate contact with a respective power conductor element and each wheel into intimate contact with a respective ridge, wherein said tension coupling means includes at least one leaf spring having first and second opposed ends respectively attached to said carrier assembly and conductor assembly.

2. The current collector trolley of claim 1 wherein said tension coupling means includes a pair of leaf springs each having respective first and second opposed ends respectively attached to said carrier assembly and conductor assembly in a spaced manner.

3. The current collector trolley of claim 2 wherein the opposed ends of each of said leaf springs are attached to respective opposed end portions of said carrier assembly and said conductor assembly so as to apply a generally uniform force between each contact brush and a respective power conductor element.

4. The current collector trolley of claim 1 wherein said conductor assembly further includes a plurality of springs each attached to a respective sliding contact brush for further urging each sliding contact brush into intimate contact with a respective power conductor element.

5. The current collector trolley of claim 1 further comprising a tilt mechanism connecting said carrier assembly and said conductor assembly for tilting said conductor assembly relative to said carrier assembly to facilitate access to the current collector trolley.

6. The current collector trolley of claim 5 wherein said carrier assembly includes a pair of spaced plates each having a pair of respective aligned, elongated, linear slots therein, said tilt mechanism including first and second removable pairs of nut and bolt combinations each inserted through a respective elongated, linear slot in a respective plate and through said conductor assembly to permit rotational displacement between said carrier and conductor assemblies and to maintain said carrier and conductor assemblies in a tilted relative orientation to facilitate access to the current collector trolley.

7. If The current collector trolley of claim 1 wherein said plural elongated power conductor elements and ridges are arranged in vertical or horizontal alignment.

* * * * *